United States Patent [19]
Davis et al.

[11] Patent Number: 6,065,741
[45] Date of Patent: May 23, 2000

[54] PNEUMATIC ISOLATOR ELEMENT

[75] Inventors: Toren S. Davis, Peoria; David A. Osterberg, Glendale, both of Ariz.

[73] Assignee: Honeywell Inc., Minneapolis, Minn.

[21] Appl. No.: 08/906,621

[22] Filed: Aug. 7, 1997

[51] Int. Cl.$^7$ ............................................. F16F 5/00
[52] U.S. Cl. ................................. 267/64.26; 188/322.19
[58] Field of Search ........................ 188/322.18, 322.19, 188/378; 267/64.26; 384/49, 8

[56] References Cited

U.S. PATENT DOCUMENTS

| | | | |
|---|---|---|---|
| 2,225,929 | 12/1940 | Sarazin | 416/18 |
| 2,392,387 | 1/1946 | Joy | 267/64.11 |
| 4,054,333 | 10/1977 | Esmond | 308/6 |
| 4,257,499 | 3/1981 | Deschner | 267/64.23 |
| 5,779,367 | 7/1998 | Obara | 384/8 |

FOREIGN PATENT DOCUMENTS

| | | | |
|---|---|---|---|
| 1009076 | 5/1952 | France | 384/49 |
| 0418200 | 9/1990 | Germany | F16C 29/02 |
| 405118326 | 5/1993 | Japan | 384/8 |
| 0769142 | 10/1980 | U.S.S.R. | 188/267 |
| 9821494 | 5/1998 | WIPO | F16C 29/06 |

*Primary Examiner*—Robert J. Oberleitner
*Assistant Examiner*—Pamela J. Lipka
*Attorney, Agent, or Firm*—Charles J. Ungemach

[57] ABSTRACT

A substantially friction free mounting is presented utilizing a plurality of balls which are placed one each in a plurality of grooves between two members that are relatively movable, and a plurality of magnets are placed near the center of each groove to provide for self centering of the balls in the grooves.

11 Claims, 2 Drawing Sheets

PNEUMATIC ISOLATOR ELEMENT

CROSS REFERENCE TO RELATED APPLICATIONS

Copending application entitled Tuned Mass Damper With Tunable Damping and Anti-Friction Rolling Mass by Osterberg et al filed Jan. 25, 1996 Ser. No. 08/591,922 and assigned to the assignee of the present invention.

The invention was made with Government support under Contract F29601-95-C-0192, awarded by the Department of the Air Force. The Government has certain rights in the invention.

BACKGROUND OF INVENTION

1. Field of the Invention

This invention is in the field of vibration isolators and more particularly the invention relates to a special self centering low friction mounting for a vibration isolator.

2. Description of the Prior Art

Vibration isolators are well known in the art. They include means to attach one end of the isolator to a first member which may vibrate, a damper and spring arrangement intended to absorb the vibrations of the first member and means to attach the other end of the isolator to a second member which is desired not to vibrate. Vibration isolator mounts are used when it is necessary to reduce the dynamic loads transmitted from the vibrating member, or source, to vibration sensitive or fragile equipment mounted to or near the source. For most isolator mounts, it can be stated that the performance is greatest if the natural (or break) frequency of the isolator, when combined with the isolated mass, is as low as possible as determined from the equation $f_n = \frac{1}{2}\pi(K/M)^{1/2}$ where $f_n$ is the natural frequency, K is the stiffness of the isolator mount and M is the mass to be isolated.

One of the difficulties with designing and implementing a soft mount is that they sag tremendously as their break frequency (stiffness) is reduced. Mechanical spring isolator mounts are limited by their own structural integrity and stability when trying to achieve extremely low break frequencies. Viscoelastic isolator mounts also suffer from structural integrity problems when designed to break at low frequencies. One mount that seems ideally suited for overcoming the structural problems that come with low break frequencies is a pneumatic isolator system.

Using the advantages of compressible air as a spring to soften the interface between vibration source and vibration sensitive equipment is not new. Large trucks use an airbag type of pneumatic suspension to soften the ride for their payload. Optical benches are isolated from lab floors by way of soft pneumatic mounts. Large loads can be supported by these systems by air pressure and support piston surface area. The pneumatic spring rate is dependent on air pressure, air volume and piston area supporting the load. Therefore, with proper pneumatic isolator design one can support large loads with a soft mount.

One of the problems with the present day pneumatic isolator is its inability to support side loading, particularly due to is own weight. Present day pneumatic isolators operate exclusively in parallel with the gravity vector. This makes it very difficult to take advantage of the pneumatic suspension in a 6 degree of freedom isolation system where the isolator elements are angled, as when mounted in the familiar hexapod (Stewart Platform) or octapod arrangement. Many clever side support systems have been devised but never to the degree necessary to provide soft air support in all degrees of freedom. In the above mentioned copending application, ball bearings which are positioned in grooves provides the means for almost friction free movement of the piston while providing full support and alignment when the support is mounted substantially horizontally. When horizontal, the balls are self centering, that is, they tend to move back to the middle of the grooves as they are being used. While at a full stroke, the balls may hit a groove end causing momentary stiction, this position is short lived as the piston moves back and fourth. However, when the support is mounted at an angle, and because of a small amount of clearance necessary to maintain a free rolling assembly, the effect of gravity may cause the balls to work their way down hill to the bottom of the track and the self centering action, described above, when the support is horizontal, is lost.

SUMMARY OF THE INVENTION

The pneumatic isolator element of the present invention utilizes the ball bearings mounted in linear tracks or grooves as in the above mentioned copending application but, in addition, a set of magnets are placed at the center of each groove or slot inside the piston. These magnets are sized to hold or pull the balls to the center of the track whenever mechanical clearance and gravity tend to pull them to the bottom of the track.

DETAILED DESCRIPTION OF THE PREFERRED EMBODIMENTS

Figure 1:
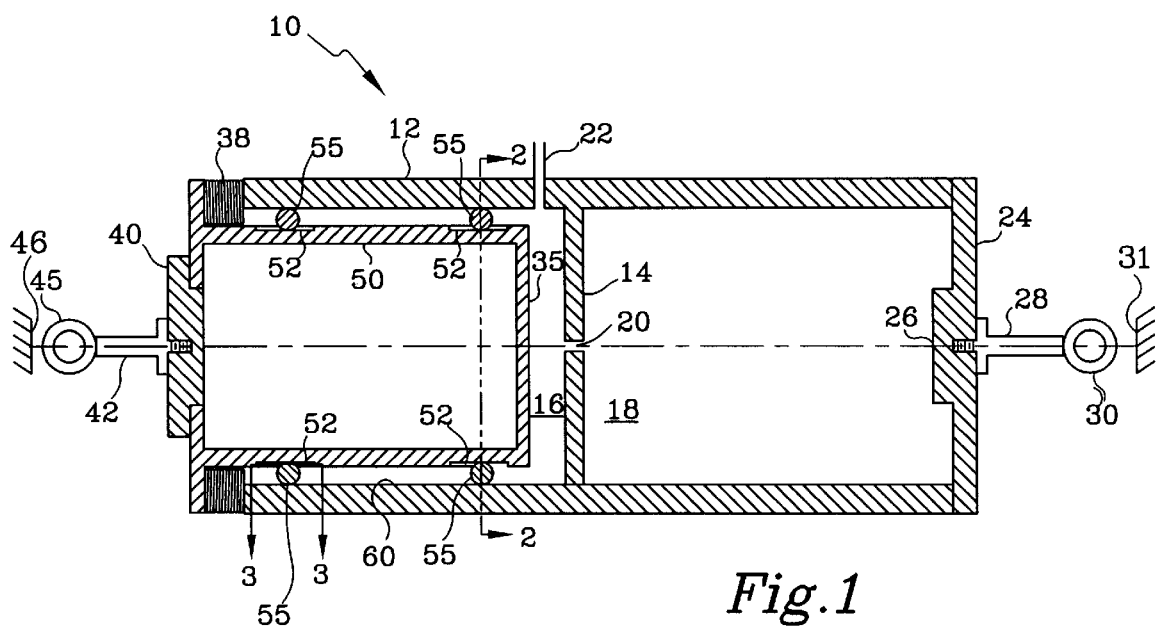
FIG. 1 shows a side view of a pneumatic isolator of the present invention.

In FIG. 1, a pneumatic isolator 10 is shown having a housing 12 divided by a vertical wall 14 into a primary chamber 16 and a secondary chamber 18 with a restrictive passage 20 in wall 14 to permit restricted gas flow between chambers 16 and 18. An aperture 22 is shown through housing 12 to provide a gas inlet for the chambers, On the right end of housing 12 is an end member 24 having a mounting rod end 28 threadedly fixed therein. Rod end 28 includes a first eye connector 30 for use in connecting the right end of isolator 10 to a first of two members to be isolated shown by hatched area 31.

The primary chamber 16 has a piston member 35 there in which is mounted to the left end of housing 12 by a welded bellows 38 to allow motion of piston 35 to the right and left in FIG. 1 while sealing chamber 16. An end cap 40 is sealed to the left end of piston 35 and a second sealing and mounting rod end 42 threadedly fixed thereto. Rod end 42 includes a second eye connector 45 for use in connecting the left end of isolator 10 to a second of the two members to be isolated shown by hatched are 46.

Chambers 16 and 18 may be filled with air or other gas through the central aperture 22 and then the chamber 18 is sealed by closing port 22 or attaching it to a supply pressure.

Piston 35 is shown having an external housing 50 in which a plurality of grooves 52 are set there in. A plurality of balls 55, one each in each of the grooves 52 are shown between the housing 50 of piston 35 and the inner surface 60 of the housing 12 of isolator 10. This allows very low friction for motion of piston 35 in chamber 16. Grooves 52 have a length sufficient to allow a complete stroke of piston 35 in chamber 16. A small mechanical space or clearance is provided between the top of the balls and the inside surface of the housing 12 to maintain a free rolling assembly. As mentioned in the above referred Davis et al application, the balls 55 are self centering as long as the apparatus is horizontal which may be true with a tuned mass damper of the Davis et al application or when the effects of gravity are not present as in a space application. However, with a vibration isolator, normally used in a gravity environment and often in a position which is not horizontal (i.e. at an angle to the horizontal) balls 55 will tend to gravitate to one end and provide friction in the ends of grooves 52. While this friction can be minimized with lubrication, it is too severe for some applications. Accordingly, in the present invention, the balls 55 are caused to self center by the use of magnets into and out of the plane of FIG. 1 on either side of each ball 55. This is seen in FIG. 2 which is a cross section of FIG. 1 taken along sight 2—2 and in FIG. 3 taken along sight 3—3.

Figure 2:
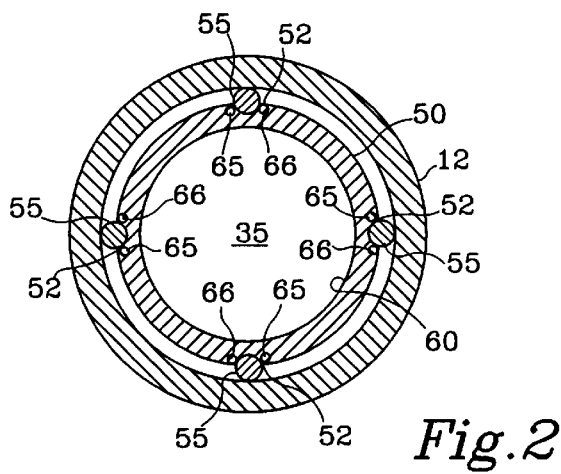
FIG. 2. Shows a cross section of FIG. 1 taken along arrows 2—2.
Figure 3:
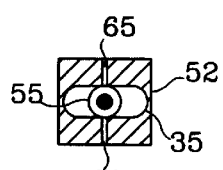
FIG. 3 shows a cross section of FIG. 1 taken along arrows 3—3.

In FIGS. 2 and 3, the housing 50 of piston 35 is formed with the grooves 52 formed in the piston 50. The grooves 52 may be circular, V shaped or other shape which provides as little friction as possible. It is seen that the balls 55 rest in the grooves 52 and are in close proximity to the inner surface 60 of the chamber 12. As mentioned, a small clearance is provided to maintain free rolling contact. In one preferred embodiment, the balls have a diameter of ⅜ inch and the space between the housing 50 and the inner surface 60 of housing 12 is 0.188 inch, operating clearance of each ball 55 placed between housing 50 and surface 60 is on the order of 0.002 inch.

To prevent the balls 55 from gravitating to one end, a pair of magnets 65 and 66 are shown adjacent to each of the grooves 52. The magnets are poled to provide a field across each groove 52 so that the balls 52, which may be made of hardened steel or other magnetic material, will be attracted to the center position between the magnets 65. The strength of the field is chosen so as to be able to overcome the effect that gravity has on the balls but not so great as to provide additional opposition to the free rolling movement of the piston 35. In the one preferred embodiment, the magnets were of strength sufficient to pull the 0.13 ounce ball from the bottom of the track back to the center.

With this unique substantially frictionless mounting, heavy loads may be isolated by pneumatic springs provided by the chambers 16 and 18. If it is desired to be able to change the spring rate of the pneumatic damper, an additional chamber such as shown in FIG. 4 may be provided.

Figure 4:
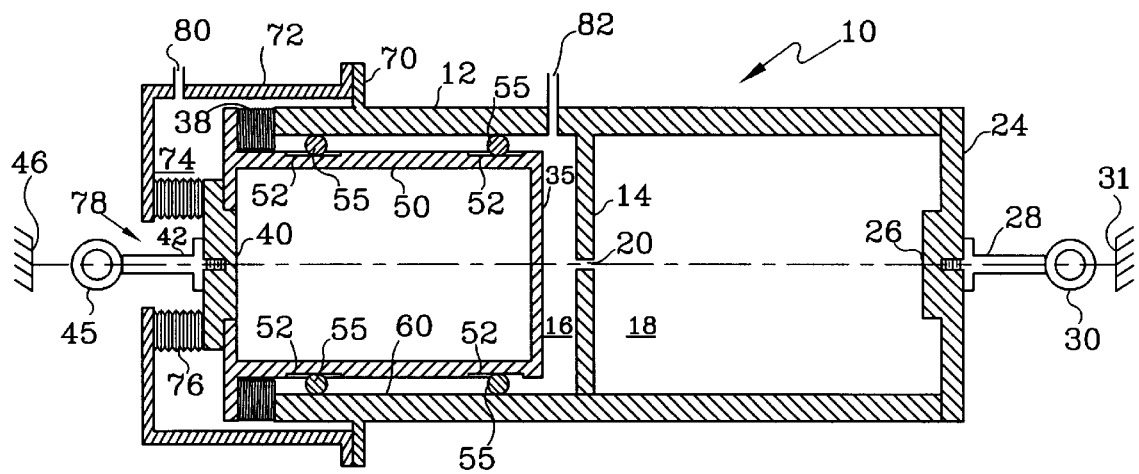
FIG. 4 shows an embodiment of the present invention capable of reacting negative gravity loads.

In FIG. 4, the basic pneumatic isolator of FIG. 1 is used and will not be described further, In FIG. 4, the housing 12 is shown with a flange 70 near the left end and an additional housing 72 is fixed thereto. Additional housing 72 surrounds the left end of housing 12 to provide a third chamber 74 which is connected to the end member 40 by a second welded bellows 76 which allows motion while providing a seal for chamber 74. The rod end 42 and eye 45 extend through a central cup 78 formed by bellows 76. A pair of pneumatic lines 80 and 82 connect the interior of chambers 74 and 16 to a source of pressure so that the pressures therein may be adjusted to vary the stiffness of the combination and used for load leveling. With pneumatic valving (not shown) this frequency adjustment can be actively controlled or preset before operation.

Figure 5:
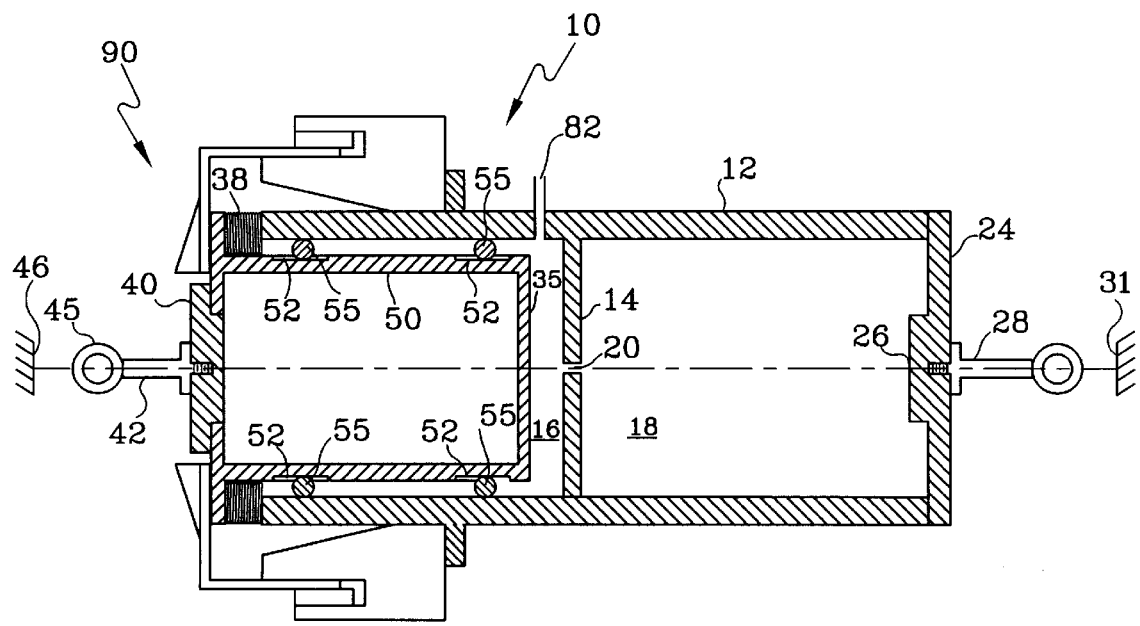
FIG. 5 shows and embodiment of the present invention combined with a linear force motor.

Another application of the present invention is shown in FIG. 5 where in the basic arrangement of FIG. 1 is the same and will not be further described. In FIG. 5, the left end of the isolator is shown with a linear force motor 90, such as a voice coil, coil bobbin attached to the piston 35 and permanent magnet core attached to housing 12. With this addition, the combination actuator can be used as a primary mover for active vibration isolation and other active control architectures such as steering or pointing payloads, and on-board vibration suppression.

It is therefore seen that we have provided an improved heavy load isolator and more particularly an very low friction motion device that will self center even at angles to the horizontal and in the presence of gravity. Many modifications will occur to those having ordinary skill in the art. For example, while welded bellows have been shown for motion permitting sealing, other devices such as a nickel deposition bellows or metal diaphragm spring may also be used. While the balls 55 have been shown as solid metal, they may be made hollow and in so doing lessen their weight. Also, while piston 35 has been shown hollow, it may be solid and the connection means at either end of the isolator may be of different character. We therefore do not wish to be limited to the specific structures used in describing the preferred embodiments.

The embodiments of the invention in which an exclusive property or right is claimed are defined as follows:

1. Apparatus for providing low friction motion between first and second members in a predetermined direction comprising:
   a plurality of grooves in the first member, each groove having side portions and a length extending in the predetermined direction;
   a plurality of balls of magnetic material, only one ball positioned in each of said grooves and between the first and second members; and
   a magnet located adjacent the side portions of each groove in a central portion of the length, the balls rolling in the grooves to allow motion between the first and second members in the predetermined direction and the magnets operable to attract the balls toward the central portion of the length.

2. Apparatus according to claim 1 wherein the motion is oscillatory between first and second positions and the length of the grooves is sufficient to allow the first and second members to oscillate between the first and second positions.

3. Apparatus according to claim 2 wherein the magnets are located approximately one half the distance between the first and second positions.

4. Apparatus according to claim 1 wherein the first and second members are cylindrical in shape, the first member being positioned in an interior portion of the second member.

5. Apparatus according to claim 4 wherein the grooves are parallel to the axes of the cylinders and the balls are spaced between the cylinders with a clearance that allows the balls to assume a position proximate the magnets.

6. Apparatus according to claim 4 further including a first connector to connect the first member to the first device; and, a second connector to connect the second member to the second device.

7. Apparatus according to claim 6 wherein the second member includes a central wall dividing the interior into first and second chambers and the first member is positioned in the first chamber.

8. Apparatus according to claim 7 wherein the central wall has a restrictive aperture therein and the first and second chambers contain a gas so as to provide an isolator with a pneumatic spring between the first and second devices.

9. Apparatus according to claim 8 further including a third member having a third chamber filled with gas and connected to the first member to provide an adjustable spring rate for the pneumatic spring.

10. Apparatus according to claim 8 further including a linear motor connected to the first member to provide for active vibration isolation.

11. Apparatus according to claim 1 further including a first connector to connect the first member to the first device; and, a second connector to connect the second member to the second device.

* * * * *